United States Patent
Stegmann

(10) Patent No.: US 12,480,864 B2
(45) Date of Patent: Nov. 25, 2025

(54) METHODS FOR CREATING A TRENCH IN A SAMPLE, AND COMPUTER PROGRAM PRODUCT

(71) Applicant: Carl Zeiss Microscopy GmbH, Jena (DE)

(72) Inventor: Heiko Stegmann, Dresden (DE)

(73) Assignee: Carl Zeiss Microscopy GmbH, Jena (DE)

( * ) Notice: Subject to any disclaimer, the term of this patent is extended or adjusted under 35 U.S.C. 154(b) by 179 days.

(21) Appl. No.: 18/532,516

(22) Filed: Dec. 7, 2023

(65) Prior Publication Data
US 2024/0192124 A1   Jun. 13, 2024

(30) Foreign Application Priority Data
Dec. 8, 2022   (DE) .................... 10 2022 132 705.1

(51) Int. Cl.
*G01N 21/03*   (2006.01)
*G01N 21/71*   (2006.01)
*G01N 23/2251*   (2018.01)

(52) U.S. Cl.
CPC ........... *G01N 21/03* (2013.01); *G01N 21/718* (2013.01); *G01N 23/2251* (2013.01)

(58) Field of Classification Search
CPC ... G01N 21/03; G01N 21/718; G01N 23/2251
See application file for complete search history.

(56) References Cited

U.S. PATENT DOCUMENTS

2021/0031304 A1   2/2021   Bruneel et al.
2021/0034798 A1*  2/2021   Bruneel ............... B23K 26/382
(Continued)

FOREIGN PATENT DOCUMENTS

WO   WO 2015/113302 A1   8/2015
WO   WO 2020/099011 A1   5/2020
WO   WO 2021/180600 A1   9/2021

OTHER PUBLICATIONS

German Office Action, with translation thereof, for corresponding DE Appl No. 10 2022 132 705.1, dated Aug. 30, 2023.
(Continued)

*Primary Examiner* — Jamil Ahmed
(74) *Attorney, Agent, or Firm* — Fish & Richardson P.C.

(57) ABSTRACT

A method for creating a trench with a defined intended trench depth in a sample uses a particle beam system configured to create a particle beam to ablate material from the sample. An exemplary method comprises: defining a particle beam system setting which is a setting of the particle beam system for implementing an ablation unit step with the particle beam; acquiring calibration data records using the defined particle beam system setting on a calibration sample; determining a regression curve based on the acquired calibration data records, the regression curve being defined on the basis of at least one parameter that characterizes the ablation unit step; determining an implementation number based on the determined regression curve and the intended trench depth; and creating a trench in the sample by repeatedly implementing the ablation unit step with the particle beam system setting in accordance with the determined implementation number.

20 Claims, 12 Drawing Sheets

(56) References Cited

U.S. PATENT DOCUMENTS

2021/0405544 A1  12/2021  Werkman et al.
2022/0392793 A1  12/2022  Buxbaum et al.

OTHER PUBLICATIONS

A. Zemaitis et al., "Advanced laser scanning for highly-efficient ablation and ultrafast surface structuring: experiment and model", Scientific Reports, 2018, pp. 1-14.
E. Audouard et al., "Engineering model for ultrafast laser microprocessing", Proc. SPIE, vol. 9740, 2016, pp. 1-15.

* cited by examiner

| # | Particle beam system setting | Sample property (material) | Calibration data records: a plurality of combinations of (implementation number; trench depth) |
|---|---|---|---|
| 1 | A1 | B1 | K1={(10; $D_{10}$); (20; $D_{20}$); (50; $D_{50}$)} |
| 2 | A2 | B1 | K2 |
| ... | ... | ... | ... |

| # | Particle beam system setting | Sample property (material) | Regression curve |
|---|---|---|---|
| 1 | A1 | B1 | R1 |
| 2 | A2 | B1 | R2 |
| 3 | A1 | B2 | R3 |
| 4 | A2 | B2 | R4 |
| ... | ... | ... | ... |

Figure 9

| # | Particle beam system setting | Sample property (material) | Calibration data records: a plurality of combinations of (implementation number; measured trench depth) |
|---|---|---|---|
| 1 | A1 | B1 | K1 |
| 2 | A2 | B1 | K2 |
| 3 | A1 | B2 | K3 |
| 4 | A2 | B2 | K4 |
| ... | ... | ... | ... |

Figure 11

METHODS FOR CREATING A TRENCH IN A SAMPLE, AND COMPUTER PROGRAM PRODUCT

CROSS-REFERENCE TO RELATED APPLICATION

This application claims benefit under 35 U.S.C. § 119 to German Application No. 10 2022 132 705.1, filed Dec. 8, 2022. The entire disclosure of this application is incorporated by reference herein.

FIELD

The present disclosure relates to methods for creating a trench with a defined trench depth in a sample and to a computer program product for implementing the methods on a particle beam system. The methods are implemented using a particle beam system configured to create a particle beam which can ablate material from the sample. For example, the particle beam can be a light beam, a laser beam, a continuous laser beam, a pulsed laser beam, an electron beam or an ion beam.

BACKGROUND

Numerous applications in the field of microstructuring, production and analysis of materials and devices (samples), such as semiconductor devices, involve material to be ablated from the sample in a predefined spatially restricted region. On account of relatively high ablation rates, a laser beam is initially used here for the ablation of material. An ion beam or an electron beam can be used for ablation at low ablation rates. In both cases, but especially in the case of laser beam ablation, restricting the ablation to a predetermined depth is to be considered.

Applications involving a restriction of the material ablation to a certain depth for example include the following: laser cutting of a cross section of a semiconductor chip in a package up to a defined target depth, for example such that a chip is transversely cut but not a mount located therebelow; ablating stacked semiconductor chips in a package to a defined target depth, for example such that a certain number of chips in a chip stack are ablated from above. In this case, it may also be desirable for a most recently exposed chip to be ablated only in part down to a desired residual thickness; thinning a semiconductor chip from the substrate side such that the thickness of the substrate is reduced to a few µm or a few 10 µm ("backside thinning"); laser cutting of an opening in semiconductor chips in a package down to a defined target depth, for example until certain electrical connection points are exposed.

Moreover, not ablating more material than necessary when processing a sample is generally advantageous, in order to reduce one or more of the following effects: redeposition of already ablated material; burr formation at the upper edge of a cross section through the interaction of the particle beam with redeposited material during a cutting procedure; deposition of ablated material on the sample surface around a cut.

The depth of the material ablation generally depends on the physical properties of the material of the sample itself and on a multiplicity of operational parameters of the particle beam system (for example, power, pulse frequency in the case of a pulsed beam, scanning speed, focusing of the particle beam, etc.) which creates the particle beam and scans the latter over the sample. When the ablation is implemented by multiple implementations of a uniform ablation procedure, the depth of material ablation achieves has a nonlinear relationship with the number of implementations of the uniform ablation procedure.

Conventionally, complicated experiments were performed for the targeted setting of the depth of an ablation. To this end, material is ablated from numerous test samples with numerous different combinations of material properties and operational parameters. Subsequently, the obtained depths are measured and the combination coming closest to the sought-after target depth is selected. This combination is subsequently used to process the actual samples.

This procedure can include one or more of numerous disadvantages. It can involve much time and effort as a result of a large number of combinations of material properties and operational parameters to be measured; accordingly, there is a large area taken up by test samples. In practice, only some of the combinations can in fact be tested as a result of the large number of combinations of material properties and operational parameters to be measured. In general, both interpolation to depths between experimentally ascertained depths and extrapolation to depths greater than the experimentally ascertained depths are too inaccurate on account of the nonlinear relationship between the obtained depth and the number of implementations of the uniform ablation procedure.

Then again, there exist comprehensive mathematical models for simulating material processing; however, these can involve accurate knowledge of a few physical properties of the material of the sample, for example ablation thresholds or various optical, electrical or magnetic properties. However, these are usually unknown in the case of microscopic samples.

SUMMARY

The present disclosure seeks to provide an easily applicable, fast method by which material of a microscopic sample can be ablated to a predetermined target depth.

A first aspect of the disclosure relates to a method for creating a trench with an intended trench depth in a sample by ablating material from the sample via a particle beam created by a particle beam system and focused into a work region of the particle beam system, comprising: defining a particle beam system setting which is a setting of the particle beam system for implementing an ablation unit step with the particle beam; acquiring calibration data records using the defined particle beam system setting on a calibration sample; determining a regression curve on the basis of the acquired calibration data records, wherein the regression curve is defined on the basis of at least one parameter that characterizes the ablation unit step; determining an implementation number on the basis of the determined regression curve and the intended trench depth; and creating a trench in the sample by repeatedly implementing the ablation unit step with the defined particle beam system setting in accordance with the determined implementation number.

The method according to the first aspect involves a regression curve which can determine an accurate estimate of an implementation number for an ablation unit step (i.e. the number of times the ablation unit step is implemented) for a desired target trench depth. The regression curve takes account of the physical properties of the ablation process. Parameters of the regression curve will be determined using a few calibration measurements. On the basis of the regression curve it is possible to accurately specify a precise relationship between the implementation number for the ablation unit step and the trench depth, even with only a few calibration measurements.

A second aspect of the disclosure relates to a method for creating a trench with an intended trench depth in a sample by ablating material from the sample via a particle beam created by a particle beam system and focused into a work region of the particle beam system, comprising: providing a database with a plurality of data records, wherein each of the data records contains a particle beam system setting, which is a setting of the particle beam system for implementing an ablation unit step with the particle beam, a sample property, which is a property of the sample, and a regression curve, wherein the regression curve is defined on the basis of at least one parameter that characterizes the ablation unit step; selecting a first particle beam system setting and a first sample property, which are contained in one of the data records in the database; obtaining a first regression curve from the data record in the database containing the first particle beam system setting and the first sample property; determining an implementation number on the basis of the first regression curve and the intended trench depth; and creating a trench in the sample by repeatedly implementing the ablation unit step with the first particle beam system setting in accordance with the determined implementation number.

The method according to the second aspect involves various regression curves stored in the database; these enable an accurate estimate of an implementation number for the ablation unit step (i.e. the number of times the ablation unit step is implemented) for a desired intended trench depth, with the various regression curves being associated with different combinations of particle beam system setting (operational parameter) and sample property (material of the sample) and taking into account the physical properties of the ablation process. For example, the regression curves are each determined by a few calibration measurements using the method according to the first aspect and are subsequently stored in the database.

A sample can be ablated down to a desired intended trench depth by virtue of initially obtaining the regression curve of the data record which contains a predetermined particle beam system setting and a predetermined sample property of a calibration sample, which is the same as or similar to the sample property of the sample, and subsequently determining the number of implementations of the ablation unit step used to create the trench with the intended trench depth using the selected regression curve. Thus, there is no need to determine the regression curve for a predetermined combination of particle beam system setting and sample property by way of new calibration measurements if the database already contains a regression curve associated with this combination; instead, the regression curve can be obtained directly from the database.

A third aspect of the disclosure relates to a method for creating a trench with an intended trench depth in a sample by ablating material from the sample via a particle beam created by a particle beam system and focused into a work region of the particle beam system, comprising: providing a database with a plurality of data records, wherein each of the data records comprises a particle beam system setting, which is a setting of the particle beam system for implementing an ablation unit step with the particle beam, a sample property, which is a property of the sample, and a plurality of calibration data records, wherein each of the calibration data records contains a predetermined implementation number for the ablation unit step and a depth of a trench created by implementing the ablation unit step in accordance with the predetermined implementation number; selecting a first particle beam system setting and a first sample property, which are contained in one of the data records; obtaining first calibration data records from the data record containing the first particle beam system setting and the first sample property; determining a regression curve on the basis of the obtained first calibration data records, wherein the regression curve is defined on the basis of at least one parameter that characterizes the ablation unit step; determining an implementation number on the basis of the determined regression curve and the intended trench depth; and creating a trench in the sample by repeatedly implementing the ablation unit step with the first particle beam system setting in accordance with the determined implementation number.

The method according to the third aspect involves a plurality of data records stored in the database, wherein each data record comprises a particle beam system setting, a sample property and a plurality of calibration data records, wherein each calibration data record comprises an implementation number for the ablation unit step and a depth of a trench created by implementing the ablation unit step in accordance with the implementation number. A regression curve is calculated from the calibration data records of a data record and then enables an accurate estimation of an implementation number for the ablation unit step (i.e. the number of times the ablation unit step is implemented) for a desired target trench depth. The data records can be determined by a few calibration measurements using the method according to the first aspect and subsequently stored in the database. A new sample can be ablated down to a desired intended trench depth by virtue of initially selecting from the database the data record which contains a predetermined particle beam system setting and a predetermined sample property, subsequently determining a regression curve, which considers the physical properties of the ablation process, on the basis of the calibration data records of the selected data record, and finally determining the number of implementations of the ablation unit step used to create the trench with the intended trench depth using the determined regression curve. Thus, there is no need to determine the regression curve for a predetermined combination of particle beam system setting and sample property by way of new calibration measurements if the database already contains a plurality of calibration data records associated with this combination; instead, the regression curve can be determined directly from the calibration data records of one of the data records.

A fourth aspect of the disclosure relates to a method for creating a trench with an intended trench depth in a sample by ablating material from the sample via a particle beam created by a particle beam system and focused into a work region of the particle beam system, comprising: providing a database with a plurality of data records, wherein each of the data records comprises a particle beam system setting, which is a setting of the particle beam system for implementing an ablation unit step with the particle beam, a sample property, which is a property of the sample, and a regression curve, wherein the regression curve is defined on the basis of at least one parameter that characterizes the ablation unit step; selecting a first sample property from one of the data records; selecting one of the data records containing the selected first sample property and a first regression curve, which assigns the intended trench depth a value satisfying a predetermined condition; obtaining a first particle beam system setting contained in the selected data record; determining a first implementation number on the basis of the regression curve contained in the selected data record and the intended trench depth $D_X$; and creating a trench in the sample by repeatedly implementing the ablation unit step with the obtained first particle beam system setting in accordance with the determined first implementation number.

For example, the method according to the fourth aspect relates to the case in which an implementation number for an intended trench depth, as determined using one of the methods from the first to third aspect, has a value which deviates (significantly) from an integer. Since the ablation unit step can only be implemented an integer number of times, the situation may arise in which an actual trench depth deviates (significantly) from the intended trench depth if the determined implementation number has a value which deviates (significantly) from an integer and the number of times the ablation unit step was implemented was rounded to the closest integer. To avoid such inaccuracies, a particle beam system setting is determined for a predetermined intended trench depth and a predetermined sample property in accordance with the method according to the fourth aspect, the associated regression curve of the particle beam system setting supplying an implementation number for the ablation unit step for the predetermined intended trench depth which fulfils a predetermined condition, for example is as close as possible to an integer. Thus, the method according to the fourth aspect determines a particle beam system setting and an implementation number, which fulfil the predetermined condition, for a predetermined intended trench depth and a predetermined sample property. It is thus possible to create a trench whose actual depth comes particularly close to the desired intended trench depth.

A fifth aspect of the disclosure relates to a computer program product which comprises a computer program with instructions which control a particle beam system such that one of the methods described herein is carried out. The computer program product can be a computer program embodied on an information carrier, for example on a machine-readable storage apparatus (a computer-readable medium, a non-volatile computer-readable storage medium, and the like) or in a propagated signal, for processing by or controlling the processing of a data processing device, for example a programmable processor, a computer or a plurality of computers.

BRIEF DESCRIPTION OF THE DRAWINGS

FIG. 9 shows an exemplary content of a database according to the second embodiment.

FIG. 11 shows an exemplary content of a database according to the third embodiment.

DESCRIPTION OF EMBODIMENTS

Certain embodiments of the disclosure are explained in more detail hereinbelow with reference to figures.

First Embodiment

Figure 1:
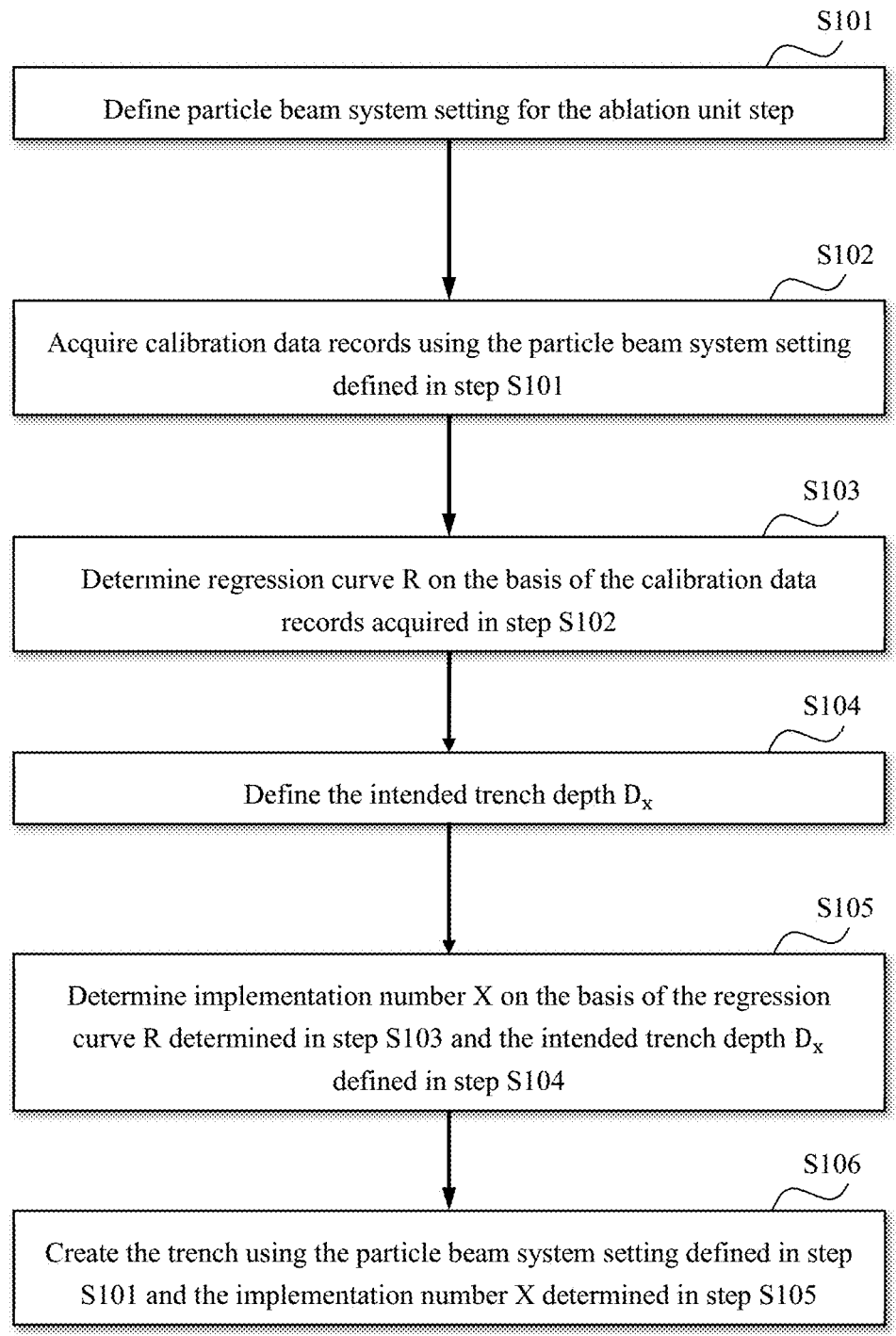
FIG. 1 shows a flowchart of a method according to a first embodiment for creating a trench.

A first embodiment is described hereinafter with reference to FIGS. 1 to 7. FIG. 1 shows a flowchart of a method according to the first embodiment for creating a trench 1 in a sample 3. It is the object of the method to create a trench 1 in a homogeneous sample 3 by ablating material from the sample 3 using a particle beam 5, the trench having a floor that is as flat as possible and a desired depth, referred to herein as intended trench depth $D_X$. The particle beam 5 is created by a particle beam system 100 and focused into a work region 4 by the particle beam system 100.

For example, the particle beam system 100 is a laser and the particle beam accordingly is a laser beam, which is to say a beam of photons. The laser beam can be a beam of laser pulses which are characterized by a pulse length (i.e. a temporal length of an individual pulse) and a pulse repetition rate (i.e. a frequency at which the laser pulses are emitted). The laser beam can be an uninterrupted laser beam.

For example, the particle beam system 100 is an electron beam system and the particle beam accordingly is an electron beam. For example, the particle beam system 100 is an ion beam system and the particle beam accordingly is an ion beam.

Step S101 comprises: defining a particle beam system setting which is a setting of the particle beam system 100 for implementing an ablation unit step with the particle beam 5. By way of example, an operator of the particle beam system 100 defines the particle beam system setting by inputs, which are input into a controller 101 by way of an input device 102 (see FIG. 7). The particle beam system setting is a setting of the particle beam system 100 for implementing the ablation unit step with the particle beam 5. The ablation unit step denotes all operations of the particle beam system 100 connected with the ablation of a single layer of material from the sample 3. Details of the ablation unit step are described with reference to FIG. 6.

For example, the particle beam system setting comprises one or more of the following settings: a setting of an intensity of the particle beam 5 (for example an intensity of a laser beam, a current intensity of an electron beam, etc.); a setting of a pulse length and a pulse repetition rate of pulses of the particle beam 5; a setting of a dwell time of the particle beam at each scanned location (i.e. the time duration during which the particle beam 5 is directed at a single scanned location before the particle beam 5 is directed at the next scanned location; or the time duration which the particle beam 5 involves to sweep over a single scanned location); a setting of a scanning path (i.e. a spatial arrangement of scanned locations and a sequence according to which the particle beam 5 sweeps over the scanned locations); a setting of a scanning speed (i.e. a speed of the particle beam 5 over the scanned locations); a setting of a focus displacement distance ($f_0$) (i.e. a spatial length between the focus of the particle beam 5 during an ablation unit step and the focus of the particle beam 5 during the subsequent ablation unit step, as measured in a depth direction 7 of the trench 1). The focus displacement distance $f_0$ can be zero or can differ from zero.

Step S102, which follows step S101, comprises: acquiring calibration data records using the defined particle beam system setting (defined in step S101) on a calibration sample 3K. The object of this step is to acquire a plurality of calibration data records by ablating material from the calibration sample 3K via multiple implementations of the ablation unit step with the defined particle beam system setting and by measuring a resultant trench depth, with each calibration data record consisting of an implementation number (i.e. the number of times the ablation unit step is implemented) and a measured depth of a trench created by implementing the ablation unit step in accordance with the implementation number.

The calibration sample 3K and the sample 3 have the same sample properties. For example, the calibration sample 3K and the sample 3 consist of the same material. For example, the calibration sample 3K and the sample 3 are spatially separated regions of the same object or are different objects of the same material.

Figure 2:
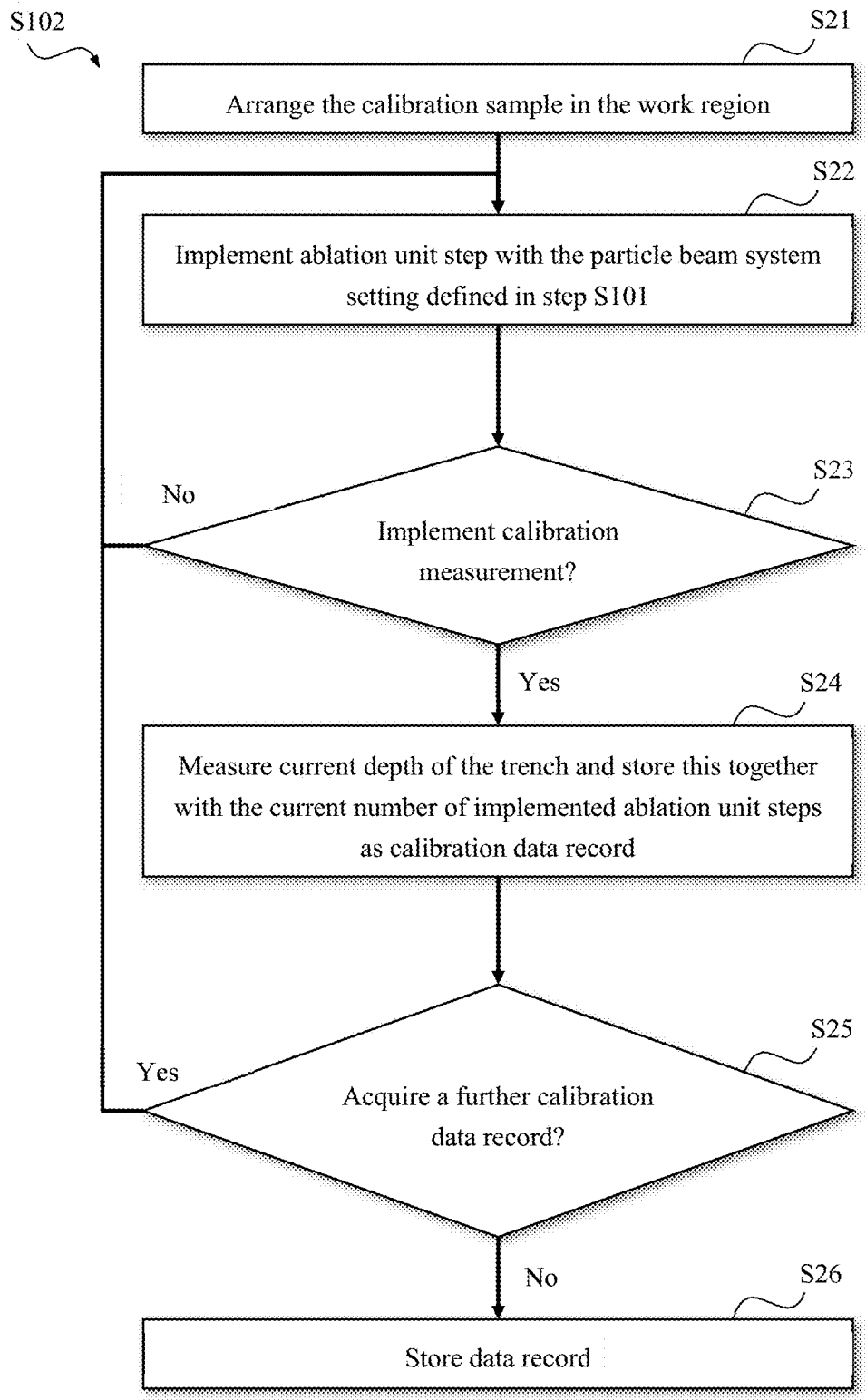
FIG. 2 shows a flowchart of the acquisition of calibration data records according to step S102 of the method shown in FIG. 1.

An exemplary implementation of step S102 is described with reference to FIG. 2.

Step S21 comprises: arranging a calibration sample 3K in the work region 4 of the particle beam system 100. The calibration measurements on the calibration sample 3K and the processing of the sample 3 can be implemented with the same particle beam system 100. Deviating from this, the calibration measurements on the calibration sample 3K and the processing of the sample 3 can be implemented in different particle beam systems. By way of example, step S21 is implemented by an operator of the particle beam system 100.

Step S22, which follows step S21, comprises: implementing the ablation unit step with the defined particle beam system setting (defined in step S101). As a result, material is ablated from the calibration sample 3K. Step S22 is implemented by the particle beam system 100.

Step S23, which follows step S22, comprises: checking whether a calibration measurement should be implemented. Step S23 is implemented by the particle beam system 100. By way of example, the operator of the particle beam system 100 defines implementation numbers, which each specify a number of implementations of the ablation unit step (step S22), the implementation of which should be followed by the implementation of a calibration measurement. For example, the operator of the particle beam system 100 defines that a calibration measurement should be implemented after the implementation of 10, 20 and 50 ablation unit steps. By way of example, the particle beam system 100 (controller 101) checks whether a calibration measurement should be implemented by virtue of comparing the number of implemented ablation unit steps with the defined implementation numbers. Should the check yield that no calibration measurement should be implemented (no in step S23), the method continues with step S22. Should the check yield that a calibration measurement should be implemented (yes in step S23), the method continues with step S24.

Step S24 comprises: measuring a current depth of the trench created by the previous ablation unit steps (step S22). The measurement can be implemented using the particle beam system 100 or any other device (for example an atomic force microscope) in fully automatic, partially automatic or manual fashion. To this end, the particle beam system 100 may comprise a measuring device, for example a scanning electron microscope. The measured current trench depth and the number of previously implemented ablation unit steps are stored as a calibration data record, for example in a data memory 105 of the particle beam system 100.

Step S25, which follows step S24, comprises: checking whether a further calibration data record should be acquired. Step S25 is implemented by the particle beam system 100. By way of example, the particle beam system 100 (controller 101) checks whether a calibration measurement has already been implemented for all defined implementation numbers by virtue of comparing the number of implemented ablation unit steps with the largest defined implementation number. Should the check yield that a further calibration measurement should be implemented (a further calibration data record should be acquired) (yes in step S25), the method continues with step S22. Should the check yield that no further calibration measurement should be implemented (no further calibration data record should be acquired) (no in step S25), the method continues with step S26.

Step S26 comprises: storing a data record comprising the particle beam system setting (defined in step S101) and the calibration data records (acquired in step S24). The data record may further comprise a sample property of the calibration sample 3K. For example, the data record is stored in a database in the data memory 105.

A predetermined number of calibration data records is acquired in this way and, in association with the particle beam system setting used and the sample property of the calibration sample, stored as a data record.

Figures 3, 4:
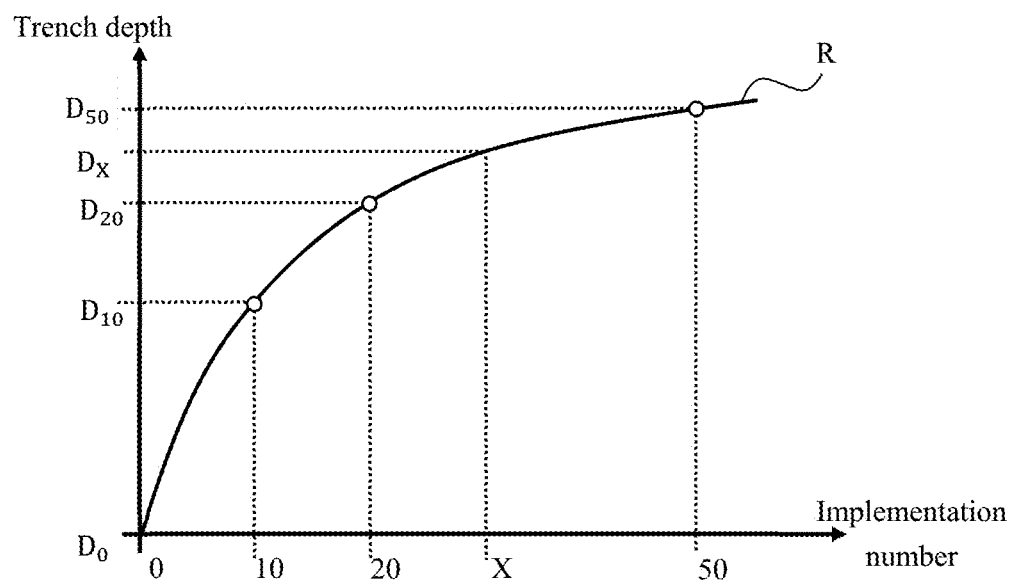
FIG. 3 shows an exemplary content of a database.
FIG. 4 shows an exemplary illustration of acquired calibration data records and a regression curve.
Figure 5:
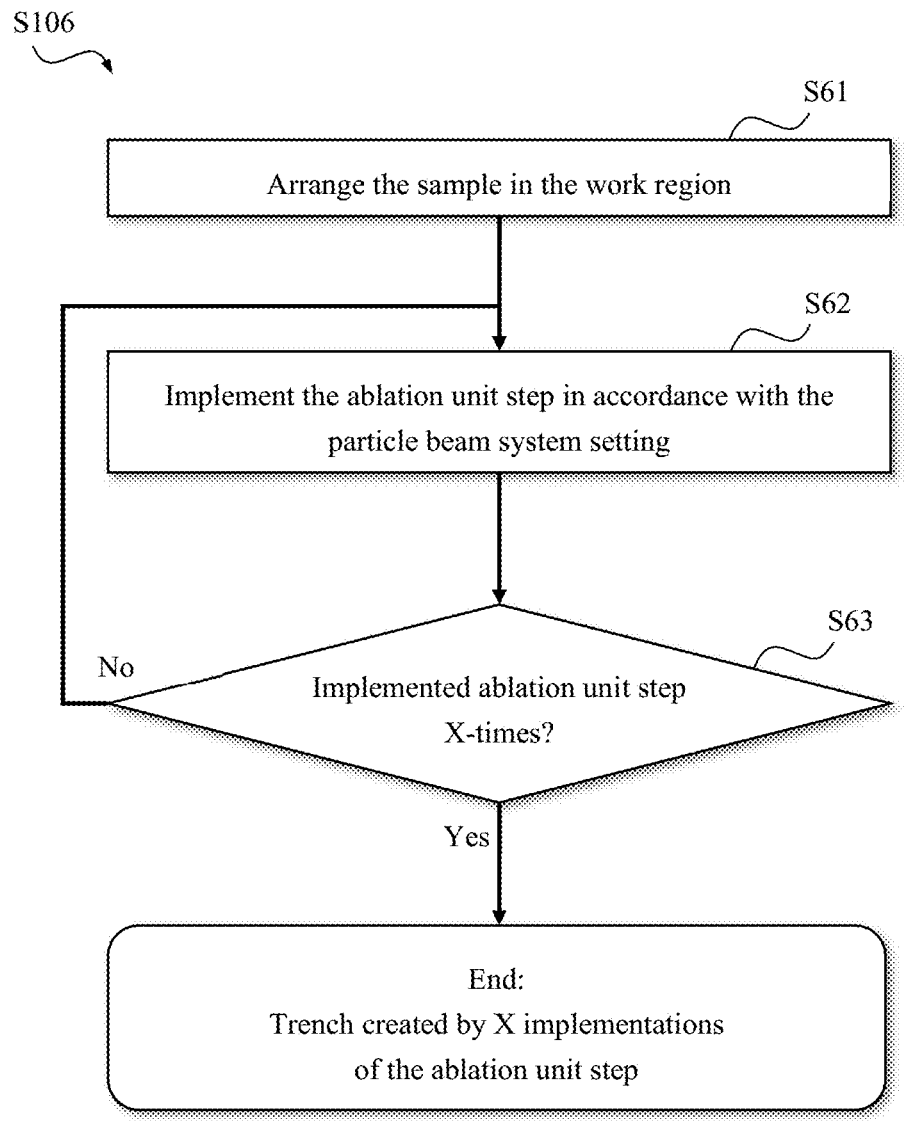
FIG. 5 shows a flowchart of the creation of a trench according to step S106 of the method shown in FIG. 1.

FIG. 3 shows an exemplary content of a database, in which a plurality of different data records of this type are stored. Each data record corresponds to a line in the database in FIG. 3. A data record in line #1 comprises a particle beam system setting A1, a sample property B1 and a set K1 of calibration data records consisting of the calibration data records (10; $D_{10}$); (20; $D_{20}$) and (50; $D_{50}$), where the first specification in parentheses specifies an implementation number and the second specification in parentheses specifies the measured depth of the trench after implementing the ablation unit steps an implementation number of times. Storing the particle beam system setting and the sample property is optional for the method according to the first aspect.

FIG. 4 shows an exemplary illustration of the calibration data records as circles in a diagram, the horizontal axis of which specifies the implementation number and the vertical axis of which specifies the trench depth. Specifically, three calibration data records (implementation number, trench depth) are depicted: (10; $D_{10}$), (20; $D_{20}$) and (50; $D_{50}$). The aforementioned nonlinear relationship between implementation number and trench depth is evident.

Step S103 (FIG. 1), which follows step S102, comprises: determining a regression curve R on the basis of the acquired calibration data records (acquired in step S102), wherein the regression curve is defined on the basis of at least one parameter that characterizes the ablation unit step. The regression curve R specifies a relationship between a number of implementations of the ablation unit step and a trench depth. In other words, the regression curve R assigns each desired trench depth an implementation number.

So that the regression curve R can reliably specify the relationship between implementation number and trench depth even in the case of a small number of calibration data records obtained by calibration measurements, the regression curve R is defined on the basis of at least one parameter that characterizes the ablation unit step. In other words, the regression curve R is parameterized, wherein the parameterization maps the physical process of ablation via a repeated ablation unit step. Parameter examples comprise: an ablation depth $d_0$ of a single ablation unit step in the case of ideal focusing (i.e. when focusing the particle beam 5 on a surface to be ablated); a deviation $F_0$ of the position of the focus of the particle beam 5 in the depth direction 7 from a surface of the sample 3 to be ablated during the first implementation of the ablation unit step; a focus displacement distance $f_0$, by which the position of the focus of the particle beam 5 is offset in the depth direction 7 between successive ablation unit steps; a length A of a portion of the particle beam 5 in the depth direction 7, in which a local intensity of the particle beam 5 exceeds an ablation threshold of the sample 3.

The ablation threshold of the sample 3 specifies the intensity of the particle beam 5, past which there is material ablation (for the given material of the sample 3) by the particle beam 5. This means that material is ablated by the particle beam if the local intensity of the particle beam 5 exceeds the ablation threshold and that no material is ablated by the particle beam 5 if the local intensity of the particle beam 5 does not exceed the ablation threshold.

Hereinafter, a specific example of such a parameterization is described in detail with reference to the ablation unit step described in FIG. 6. The ablation starts with the provision of the sample 30 (at n=1, left side). In the example shown, the sample 30 has a plane surface oriented perpendicular to the depth direction 7.

Figure 6:
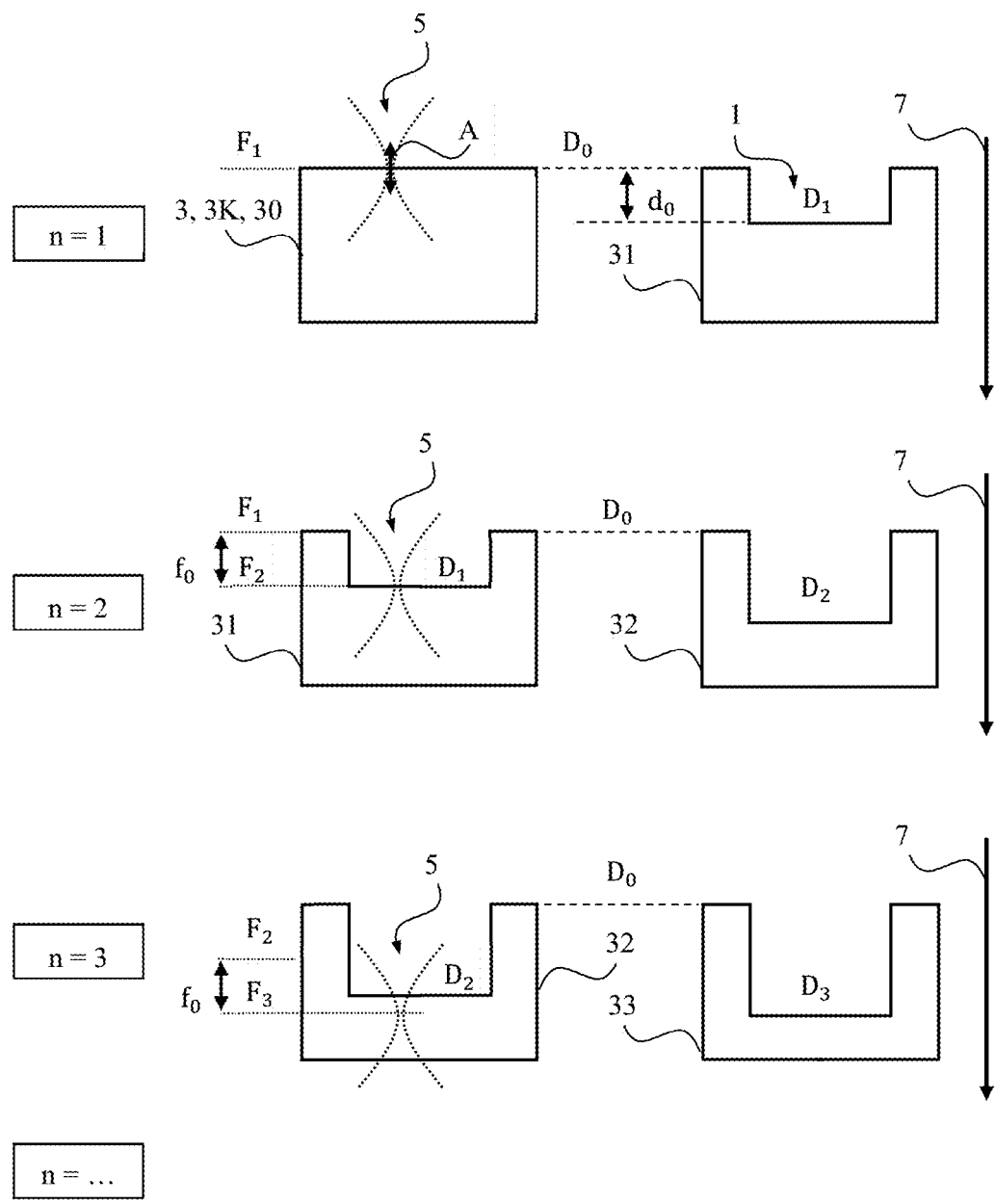
FIG. 6 shows a schematic illustration of the trench created according to step S106, in cross section after various numbers of ablation unit steps have been implemented.

Then, the particle beam 5 is directed at different scanned locations (i.e. locations on the surface of the sample 30) along the depth direction 7, which runs top to bottom in FIG. 6. The particle beam 5 is focused; in FIG. 6, this is illustrated by virtue of the cross section of the particle beam 5 (i.e. the width of the particle beam 5 in the horizontal direction of FIG. 6, which is oriented perpendicular to the depth direction 7; depicted as dotted lines) initially reducing in the depth direction 7, having the narrowest cross section at a location referred to as focus of the particle beam 5, and then increasing downstream of the focus again. The position of the focus during the n-th implementation of the ablation unit step is referred to as $F_n$. During the first implementation of the ablation unit step, the particle beam 5 is focused on the surface at the position $D_0$ in the depth direction 7, i.e. $F_1=D_0$. The focusing (i.e. the position of the focus of the particle beam 5 in the depth direction 7) remains unchanged while the particle beam 5 is scanned over the sample 30. As a result, this achieves ablation with an approximately rectangular cross section, whereby a sample 31 (at n=1, right side) with a trench 1 with an actual depth $D_1$ is obtained. This completes the first implementation of the ablation unit step (n=1).

In a subsequent second implementation of the ablation unit step (n=2), the focus of the particle beam 5 is displaced by the focus displacement distance $f_0$ in the depth direction 7 and hence has the position $F_2=F_1+1\cdot f_0$. The intention of this is for the particle beam 5 to be focused on the floor of the trench 1, with the actual depth $D_1$ unknown. Thereupon, the particle beam 5 is scanned over the sample 31, more precisely over the trench 1 in the sample 31, with the focusing $F_2$, whereby material is ablated from the floor of the trench 1 again and the sample 32 is obtained. Hence, the trench 1 of the sample 32 has an actual depth $D_2$.

In a subsequent third implementation of the ablation unit step (n=3), the focus of the particle beam 5 is displaced again by the focus displacement distance $f_0$ in the depth direction 7 and hence has the position $F_3=F_1+2\cdot f_0$. The intention of this is for the particle beam 5 to be focused on the floor of the trench 1, with the actual depth $D_2$ unknown. Thereupon, the particle beam 5 is scanned over the sample 32, more precisely over the trench 1 in the sample 32, with the focusing $F_3$, whereby material is ablated from the floor of the trench 1 again and the sample 33 is obtained. Hence, the trench 1 of the sample 32 has an actual depth $D_3$.

Subsequent implementations of the ablation unit step are implemented analogously.

Ideally, the focus of the particle beam 5 would be set in each ablation unit step to a position corresponding to the actual position of the floor of the trench 1. However, this is not the case in practice. In comparison with ideal focusing, slight defocusing, which is to say a distance between the floor of the trench 1 and the focus of the particle beam 5, leads to less material being ablated. Slight defocusing is depicted at n=3. As a result, the defocusing grows with an increasing number of implementations of the ablation unit step. The defocusing contributes to the nonlinear relationship between implementation number and trench depth shown in FIG. 4.

By way of example, the above-described method of ablating material by implementing the ablation unit step multiple times can be parameterized by Formula (1):

$$d_n = \begin{cases} d_0\left[1+\left(\dfrac{D_{n-1}-F_n}{A}\right)^2\right]^{-1} & \text{for } \left[1+\left(\dfrac{D_{n-1}-F_n}{A}\right)^2\right]^{-1} > G \\ 0 & \text{otherwise} \end{cases} \quad (1)$$

with $n \geq 1$, $D_0 = 0$ and $$F_n = \begin{cases} F_0 & \text{for } n=1 \\ (n-1)\cdot f_0 + F_0 & \text{for } n>1 \end{cases}$$

where:
$d_0$ specifies the ablation during the n-th implementation of the ablation unit step, n specifies the n-th implementation of the ablation unit step, $d_0$ specifies an ablation depth of a single ablation unit step in the case of ideal focusing, $F_n$ specifies a position of the focus of the particle beam 5 in a depth direction 7 for the n-th implementation of the ablation unit step, $F_0$ specifies a deviation of the position of the focus of the particle beam 5 in the depth direction 7 from a surface of the sample 3 to be ablated during the first implementation of the ablation unit step, $f_0$ specifies a focus displacement distance, by which the position of the focus of the particle beam 5 is offset in the depth direction 7 between successive ablation unit steps, A specifies a length of a portion of the particle beam 5 in the depth direction 7, in which a local intensity of the particle beam 5 exceeds an ablation threshold of the sample 3, G specifies an ablation threshold, past which further implementations of the ablation unit step bring about no further ablation.

The parameters $d_0$, $F_n$, $F_0$, $f_0$, A and G characterize the ablation unit step. Formula (1) considers the physical process of ablation on the basis of theoretical knowledge about a focused particle beam and its local intensity. The trench depth $D_N$ after implementing N ablation unit steps emerges from Formula (2):

$$D_N = \sum_{n=1}^{N} d_n \quad (2)$$

The regression curve R (FIG. 4) contains the points (n; D) according to Formula (2). The parameters $d_0$, $F_0$, $f_0$, A and G in Formula (1) are determined using the calibration data records by way of a regression method (for example the least squares method). Accordingly, only five calibration data records are used to determine all parameters in Formula (1). This number of calibration data records, which is equal to the number of calibration measurements to be implemented, is significantly smaller than in the conventional methods in the prior art.

Every ablation unit step contributes significantly to the ablation in many cases, for example if the implementation number X for achieving the desired intended trench depth $D_X$ is sufficiently small (for example, less than 100). In these cases, the parameter G of the ablation threshold can be neglected in Formula (1) above. Formula (1) simplifies accordingly. Moreover, the number of parameters to be determined reduces by one and hence the number of calibration measurements to be implemented also reduces by one. The parameter G of the ablation threshold remained unconsidered in the regression curve shown in FIG. 4. If the parameter G of the ablation threshold is considered, the regression curve only still runs horizontally past a certain number of implementations. In other cases, the user can specify a suitable value for the ablation threshold, for example 5% or 1%.

Moreover, the parameter $f_0$ can generally be set sufficiently accurately, with the result that the parameter $f_0$ can be considered part of the particle beam system setting and hence is specified (by the operator). In this case, the number of parameters to be determined reduces by one and hence the number of calibration measurements to be implemented also reduces by one.

Moreover, the number of calibration measurements to be implemented can also be reduced if, within the scope of focusing the particle beam during the first implementation of the ablation unit step, the focus is set exactly on the surface to be ablated, i.e. if $F_0=0$ can be assumed.

The regression curve R contains the points (n; $D_n$) according to Formula (2) and interpolates/extrapolates between these, with the result that the regression curve R assigns any desired intended trench depth $D_X$ an implementation number X, as shown in FIG. 4 in exemplary fashion.

Step S104 (FIG. 1) comprises: defining the intended trench depth $D_X$ for the sample 3. For example, an operator of the particle beam system 100 defines the intended trench depth $D_X$ by way of an input, which is input into the controller 101 of the particle beam system 100 by the input device 102.

Step S105, implemented after the implementation of steps S103 and S104, comprises: determining an implementation number X on the basis of the regression curve R (determined in step S103) and the intended trench depth $D_X$ (defined in step S104). For example, the implementation number X, which specifies the number of implementations of the ablation unit step to be implemented according to the particle beam system setting (defined in step S101) for the purpose of creating a trench with the intended trench step $D_X$, is determined by: determining a value which the regression curve R associates with the intended trench depth $D_X$; and rounding the determined value to the closest integer, whereby the implementation number X is determined (i.e. the rounded-off value corresponds to the implementation number X). The integer closest to any desired value denotes the integer of all integers whose absolute value of the difference between the value and the number is the smallest. Step S105 is implemented by the particle beam system 100.

Step S106, implemented after step S105, comprises: creating a trench 1 in the sample 3 using the particle beam system setting (defined in step S101) and the implementation number X (determined in step S105). The trench 1 is created in the sample 3 by implementing the ablation unit step in accordance with the implementation number X, which is to say by implementing the ablation unit step X-times. The creation of the trench 1 according to step S106 is described hereinbelow with reference to FIG. 5 and corresponds to the procedure described with reference to FIG. 6.

Step S61 comprises: arranging the sample 3 in the work region 4 of the particle beam system 100 (analogous to FIG. 6, n=1, left side). By way of example, step S61 is implemented by an operator of the particle beam system 100.

Step S62, implemented after step S61, comprises: implementing the ablation unit step according to the particle beam system setting (defined in step S101) (analogous to FIG. 6, n=1, right side). Step S62 is implemented by the particle beam system 100.

Step S63, implemented after step S62, comprises: checking whether the ablation unit step has already been implemented X-times (i.e. corresponding to the implementation number X determined in step S105, i.e. as often as specified by the implementation number X determined in step S105). For example, step S63 is implemented by the particle beam system 100. Should it be determined in step S63 that the ablation unit step has not yet been implemented in accordance with the implementation number X (no in step S63), the method continues with step S62 (FIG. 6, n=2, 3, . . . ). Should it be determined in step S63 that the ablation unit step has been implemented in accordance with the implementation number X (yes in step S63), step S106 is terminated, whereby a sample 3 with a trench 1 was created.

Figure 7:
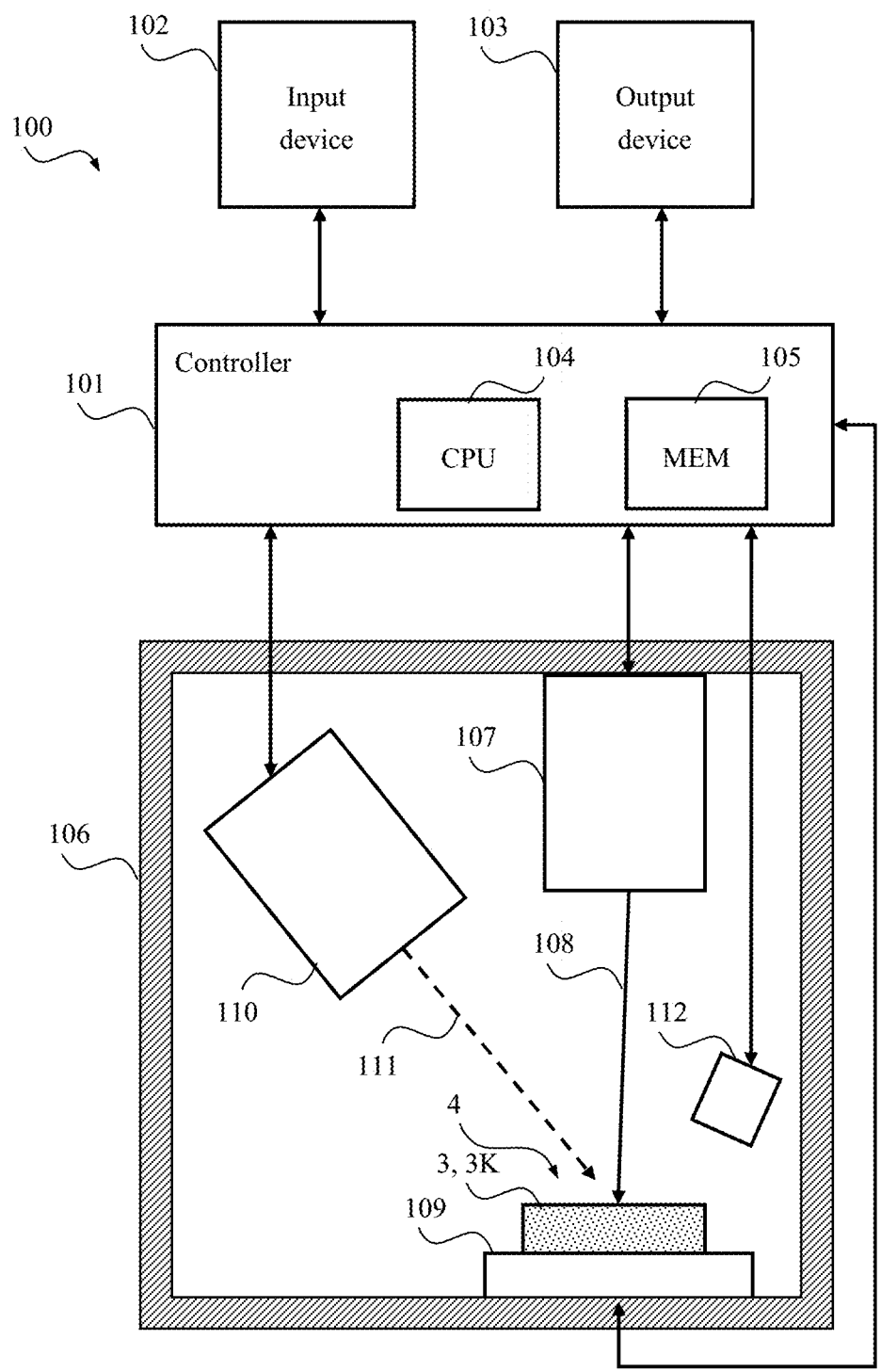
FIG. 7 shows a schematic illustration of a particle beam system for implementing the method shown in FIG. 1.

An example of a particle beam system 100 is described hereinafter with reference to FIG. 7. The particle beam system 100 comprises a controller 101 with a CPU 104 and a data memory 105, an input device 102, an output device 103, a vacuum chamber 106, a laser 107 configured to create a laser beam 108 and direct the latter at a sample 3, 3K, a sample stage 109, an electron beam column 110 configured to create an electron beam 111 and direct the latter at the sample 3, 3K, and a detector 112. The laser 107, the electron beam column 110 and the detector 112 are communicatively connected to the controller 101 in order to transmit signals or data to the controller 101 and receive these from the latter.

In the example shown here, the laser 107 serves to ablate material from the sample 3, 3K according to the methods described herein, whereas the electron beam column 110 and the detector 112, in conjunction with a data analysis in the controller 101, provide a device for measuring the depth of a trench 1 in the sample 3, 3K. This configuration is merely exemplary. In general, ablation of material and measurement of the trench depth need not be provided by the same system and could instead be provided by different devices or different systems.

The controller 101 receives instructions entered by an operator into the input device 102 (for example keyboard, mouse, etc.) and stores these in the data memory 105. The controller 101 controls the output device 103 (for example monitor, etc.) to output information. The CPU 104 executes a computer program stored in the data memory 105 in order to control the other system components and process data.

The laser 107 is configured to create the laser beam 108 and focus the latter on a work region 4, in which the sample 3, 3K can be arranged. Moreover, the laser 107 is configured to direct the focused laser beam 108 at a multiplicity of different scanned locations, for example by deflecting the laser beam 108.

The electron beam column 110 is configured to create the electron beam 111 and focus the latter on the work region 4 (or any other region), in which the sample 3, 3K can be arranged. Moreover, the electron beam column 110 is configured to direct the focused electron beam 111 at a multiplicity of different scanned locations, for example by deflecting the electron beam 111.

The detector 112 is configured to detect particles which emanate from the sample 3, 3K as a result of the interaction of the beams 108, 110 with the sample 3, 3K. For example, such particles are electrons, ions or photons.

Second Embodiment

A second embodiment is described hereinafter with reference to FIGS. 8 and 9. The method according to the second embodiment differs from the method according to the first embodiment in that the regression curve R is not determined by acquiring calibration data records via a measurement on a calibration sample and calculating the regression curve R from the measured calibration data records (in accordance with the first embodiment), but that the regression curve was already determined and stored in a data record in association with the particle beam system setting and the sample property of the calibration sample used to determine the regression curve R. The regression curve R suitable for a sample 3 is obtained from the database on the basis of a predetermined sample property of the sample 3 and a predetermined particle beam system setting.

Figure 8:
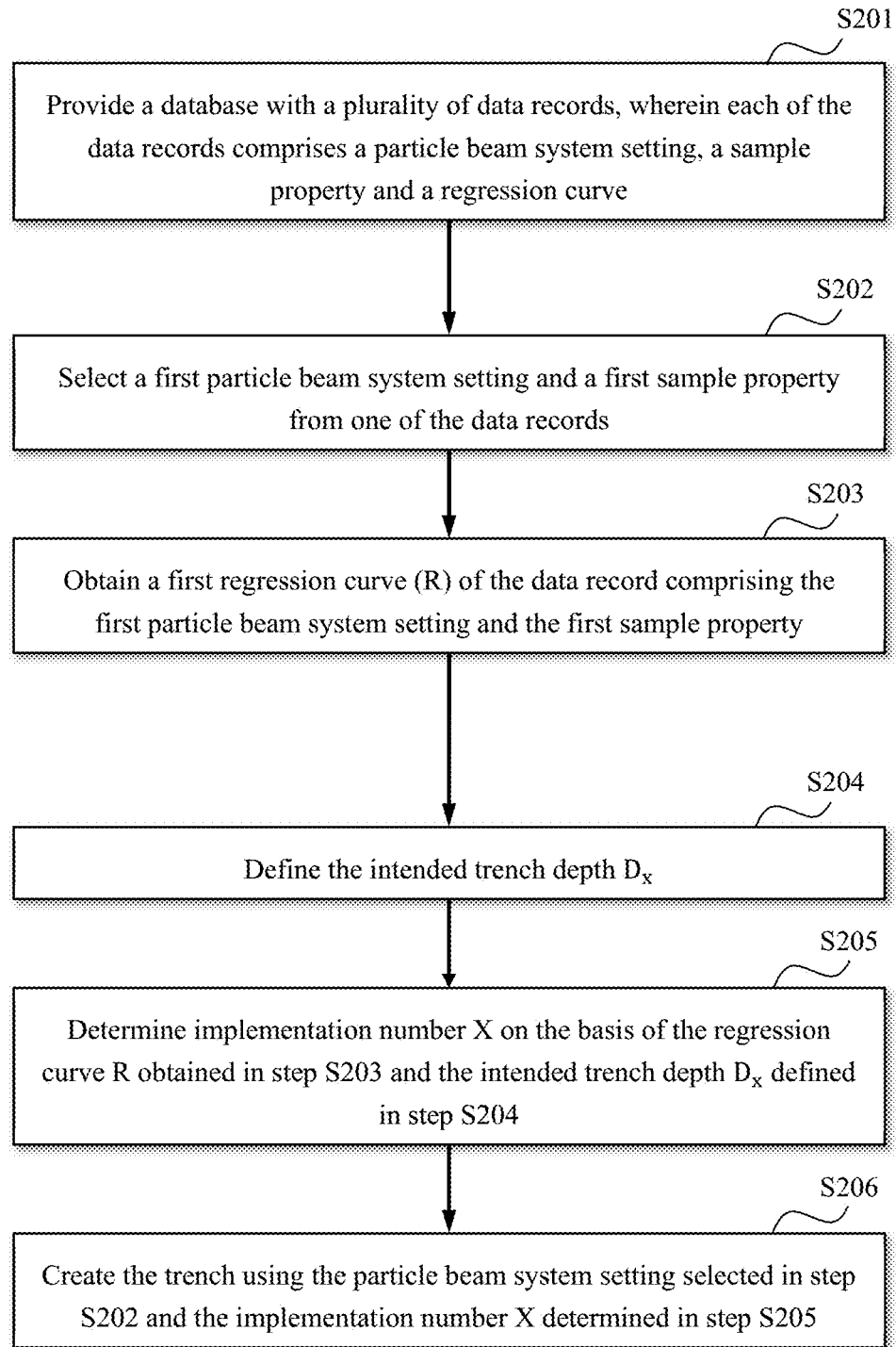
FIG. 8 shows a flowchart of a method according to a second embodiment for creating a trench.

FIG. 8 shows a flowchart of a method according to the second embodiment for creating a trench 1 with an intended trench depth $D_X$ in a sample 3 by ablating material from the sample 3 using a particle beam created by a particle beam system 100 and focused into a work region 4 of the particle beam system 100. The particle beam system 100 corresponds to that of the first embodiment; reference is made to the description thereof.

Step S201 comprises: providing a database with a plurality of data records, wherein each of the data records comprises a particle beam system setting, which is a setting of the particle beam system 100 for implementing an ablation unit step with the particle beam 5, a sample property, which is a property of a calibration sample 3K, and a regression curve R, wherein the regression curve is defined on the basis of at least one parameter that characterizes the ablation unit step. The data records can be determined using steps S101 to S103 of the method shown in FIG. 1. FIG. 9 shows an exemplary content of the database. A data record in line #1 of the database comprises a particle beam system setting A1, a sample property B1 and a regression curve R1. A data record in line #2 of the database comprises a particle beam system setting A2, the sample property B1 and a regression curve R2. A data record in #3 of the database comprises the particle beam system setting A1, a sample property B2 and a regression curve R3. A data record in line #4 of the database comprises the particle beam system setting A2, the sample property B2 and a regression curve R4. For example, the database is stored in the data memory 105 or can be obtained from an external data memory.

Step S202, which follows step S201, comprises: selecting a first particle beam system setting and a first sample property, which are contained in one of the data records of the database. The first sample property characterizes the sample 3 in which the trench 1 should be created. This means that a data record containing a sample property of a calibration sample 3K, which is the same as or similar to the sample property of the sample 3, is selected in step S202.

By way of example, an operator chooses the particle beam system setting A1 and the sample property B1 from line #1 or the particle beam system setting A2 and the sample property B1 from line #2 from the database if the intention is to create a trench in a sample 3 with the sample property B1. By contrast, if the intention is to create a trench in a sample 3 with the sample property B2, the operator chooses either the particle beam system setting A1 and the sample property B2 from line #3 or the particle beam system setting A2 and the sample property B2 from line #4.

Step S203, which follows step S202, comprises: obtaining a first regression curve R from one of the data records containing the first particle beam system setting (selected in step S202) and the first sample property (selected in step S202). By way of example, step S203 is implemented by the controller 101 of the particle beam system 100. If the particle beam system setting A1 and the sample property B1 from line #1 are selected in step S202, the regression curve R1 from line #1 is obtained from the database.

Step S204 corresponds to step S104, with reference being made to the description of the latter, and comprises: defining an intended trench depth $D_X$.

Step S205, which is implemented after steps S203 and S204 have been implemented, substantially corresponds to step S105, with reference being made to the description of the latter, and comprises: determining an implementation number X on the basis of the first regression curve R (obtained in step S203) and the intended trench depth $D_X$ (defined in step S204).

Step S206, which is implemented after step S205 has been implemented, substantially corresponds to step S106, with reference being made to the description of the latter, and comprises: creating a trench in the sample 3 by repeatedly implementing the ablation unit step with the first particle beam system setting (selected in step S202) in accordance with the determined first implementation number X (determined in step S205).

Third Embodiment

A third embodiment is described hereinafter with reference to FIGS. 10 and 11. The method according to the third embodiment differs from the method according to the first embodiment in that the calibration data records are not acquired by measurement on a calibration sample (in accordance with the first embodiment), but that the calibration data records were already acquired and stored in a data record in a database in association with the particle beam system setting and the sample property of the calibration sample 3K used to acquire the calibration data records. The regression curve R is determined from calibration data records of one of the data records containing the particle beam system setting and the sample property of the sample 3. This means that a data record containing a sample property of a calibration sample 3K, which is the same as or similar to the sample property of the sample 3, is selected.

Figure 10:
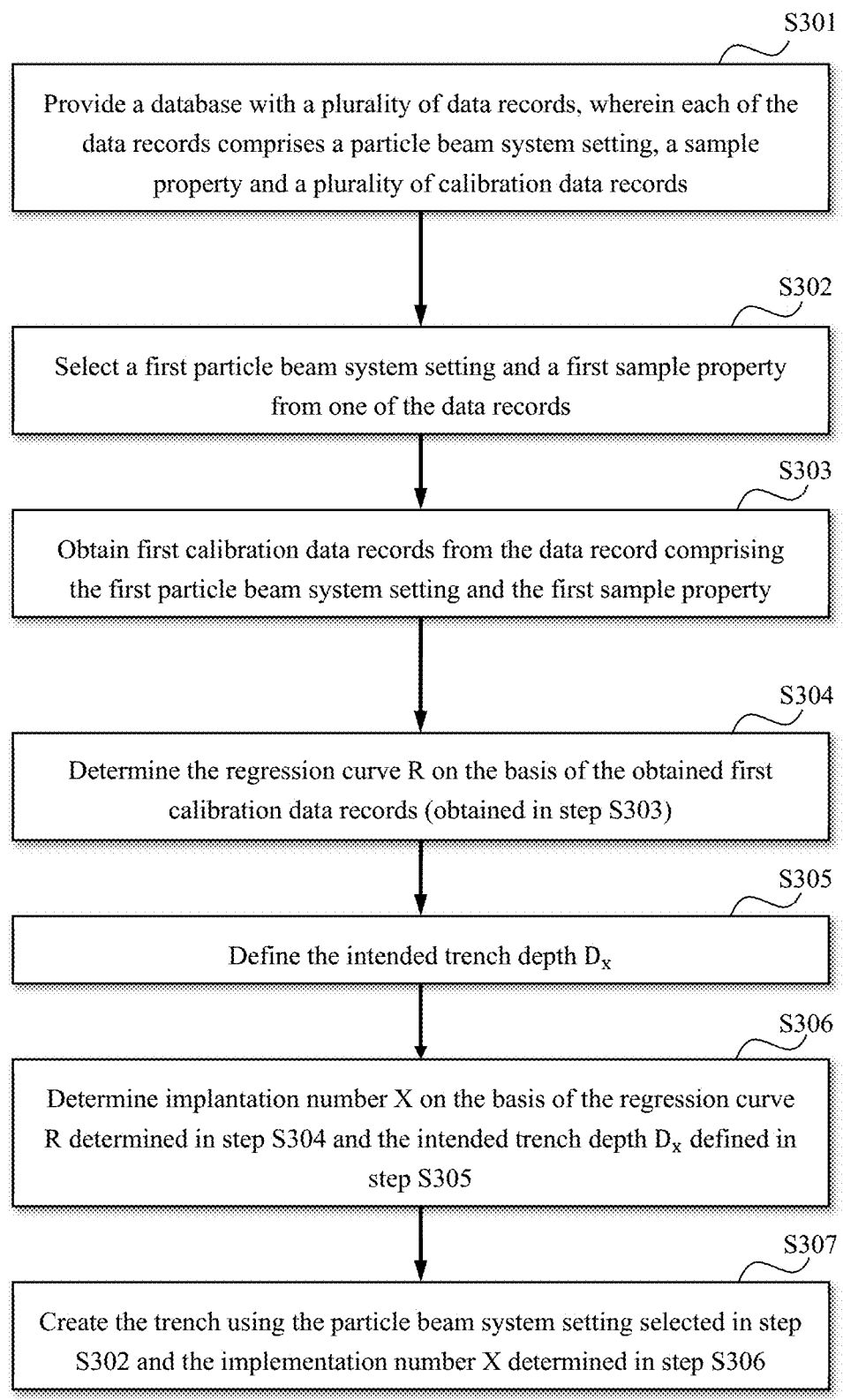
FIG. 10 shows a flowchart of a method according to a third embodiment for creating a trench.

FIG. 10 shows a flowchart of a method according to the third embodiment for creating a trench 1 with an intended trench depth $D_X$ in a sample 3 by ablating material from the sample 3 using a particle beam created by a particle beam system 100 and focused into a work region 4 of the particle beam system 100. The particle beam system 100 corresponds to that of the first embodiment; reference is made to the description thereof.

Step S301 comprises: providing a database with a plurality of data records, wherein each of the data records comprises a particle beam system setting, which is a setting of the particle beam system 100 for implementing an ablation unit step with the particle beam, a sample property, which is a property of a calibration sample 3K, and a plurality of calibration data records, wherein each of the calibration data records comprises a predetermined implementation number for the ablation unit step and a depth of a trench created by implementing the ablation unit step in accordance with the predetermined implementation number. The data records can be determined using steps S101 and S102 of the method shown in FIG. 1.

FIG. 11 shows an exemplary content of a database according to the third embodiment. A data record in line #1 of the database comprises a particle beam system setting A1, a sample property B1 and calibration data records K1. A data record in line #2 of the database comprises a particle beam system setting A2, the sample property B1 and calibration data records K2. A data record in line #3 of the database comprises the particle beam system setting A1, a sample property B2 and calibration data records K3. A data record in line #4 of the database comprises the particle beam system setting A2, the sample property B2 and calibration data records K4. For example, the database is stored in the data memory 105 or can be obtained from an external data memory.

Step S302, which follows step S301, substantially corresponds to step S202, with reference being made to the description of the latter, and comprises: selecting a first particle beam system setting and a first sample property, which are contained in one of the data records of the database. By way of example, an operator chooses the particle beam system setting A2 and the sample property B2 from line #4 from the database if the intention is to create a trench in a sample 3 with the sample property B2.

Step S303, which follows step S302, comprises: obtaining first calibration data records contained in the data record containing the first particle beam system setting (selected in step S302) and the first sample property (selected in step S302). By way of example, step S303 is implemented by the controller 101 of the particle beam system 100. If the particle beam system setting A2 and the sample property B2 from line #4 are selected in step S302, the calibration data records K4 from line #4 are obtained from the database.

Step S304, which follows step S303, substantially corresponds to step S103 and comprises: determining a regression curve R on the basis of the first calibration data records (obtained in step S303), wherein the regression curve is defined on the basis of at least one parameter that characterizes the ablation unit step.

Step S305 corresponds to step S104, with reference being made to the description of the latter, and comprises: defining an intended trench depth $D_X$.

Step S306, which is implemented after steps S304 and S305 have been implemented, substantially corresponds to step S105, with reference being made to the description of the latter, and comprises: determining an implementation number X on the basis of the regression curve R (determined in step S304) and the intended trench depth $D_X$ (defined in step S305).

Step S307, which is implemented after step S306 has been implemented, substantially corresponds to step S106, with reference being made to the description of the latter, and comprises: creating a trench 1 in the sample 3 by repeatedly implementing the ablation unit step with the first particle beam system setting (selected in step S302) in accordance with the determined implementation number X (determined in step S306).

Fourth Embodiment

A fourth embodiment is described hereinafter with reference to FIGS. 12 and 13. The method according to the fourth embodiment differs from the methods according to the first to third embodiment in that no particle beam system setting is specified, with regards to which a suitable regression curve is determined or obtained. Instead, a particle beam system setting is determined such that an implementation number for the ablation unit step for an intended trench depth $D_X$ satisfies a predetermined condition, for example that the implementation number has a small distance from the closest integer (or is an integer).

Figure 12:
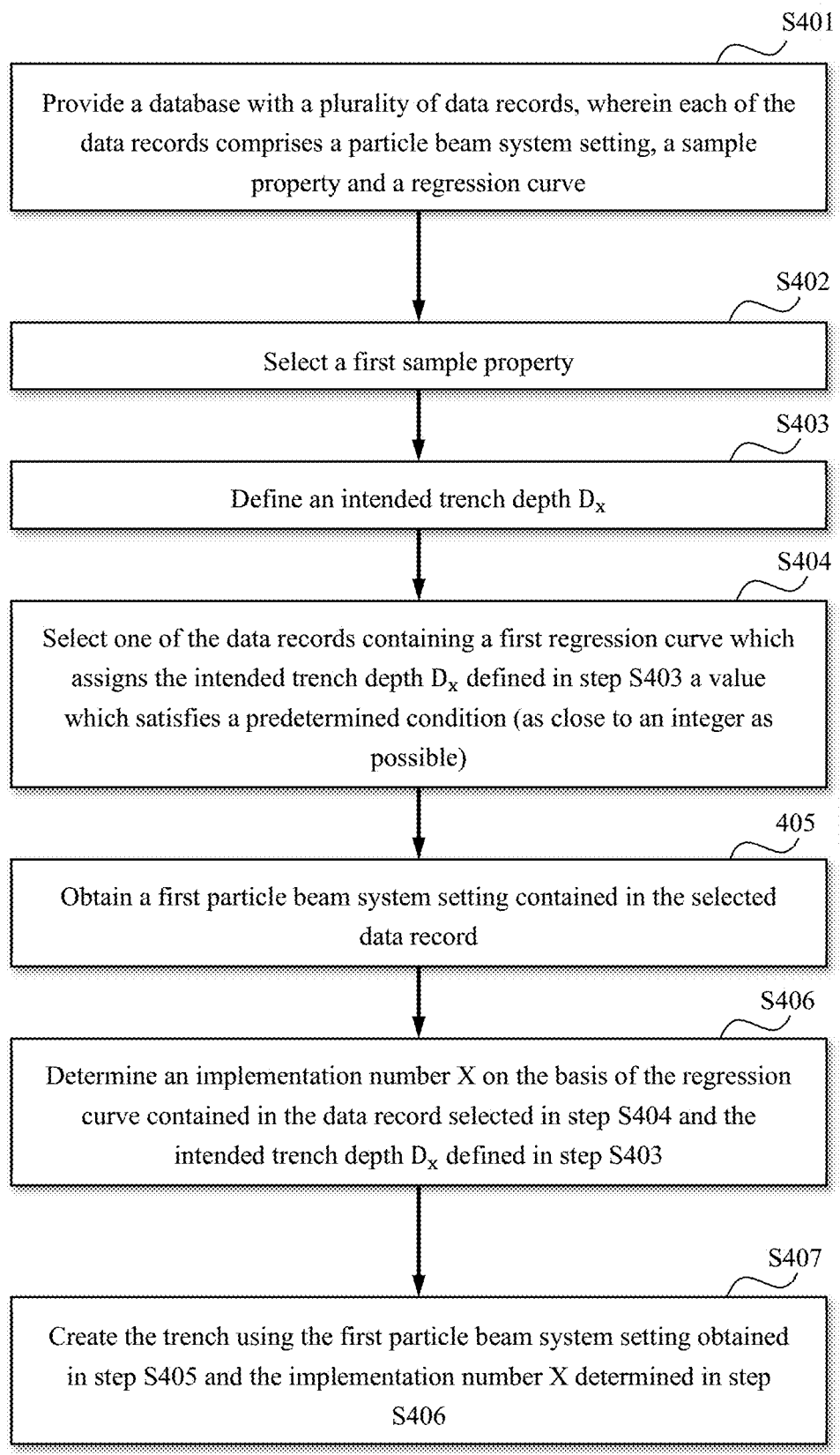
FIG. 12 shows a flowchart of a method according to a fourth embodiment for creating a trench.
Figure 13:
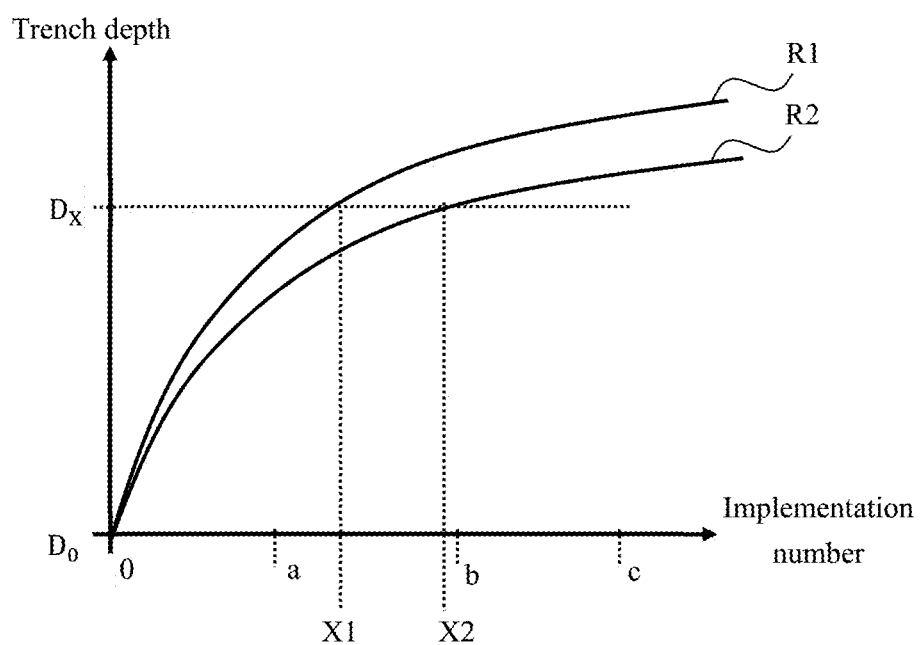
FIG. 13 shows an exemplary illustration of a plurality of different regression curves according to the fourth embodiment.

FIG. 12 shows a flowchart of a method according to the fourth embodiment for creating a trench 1 with an intended trench depth $D_X$ in a sample 3 by ablating material from the sample 3 using a particle beam created by a particle beam system 100 and focused into a work region 4 of the particle beam system 100. The particle beam system 100 corresponds to that of the first embodiment; reference is made to the description thereof.

Step S401 comprises: providing a database with a plurality of data records, wherein each of the data records comprises a particle beam system setting, which is a setting of the particle beam system 100 for implementing an ablation unit step with the particle beam 5, a sample property, which is a property of a calibration sample 3K, and a regression curve R, wherein the regression curve is defined on the basis of at least one parameter that characterizes the ablation unit step. FIG. 9 shows an example of such a database, with reference being made to the description thereof. For example, the database is stored in the data memory 105 or can be obtained from an external data memory.

Step S402 comprises: selecting a first sample property from one of the data records in the database. For example, an operator of the particle beam system 100 chooses the first sample property by way of an input, which is input into the controller 101 of the particle beam system 100 by the input device 102. This means that a data record containing a sample property of a calibration sample 3K, which is the same as or similar to the (first) sample property of the sample 3, is selected in step S402.

Step S403 corresponds to step S104, with reference being made to the description of the latter, and comprises: defining an intended trench depth $D_X$.

The first sample property identifies the sample 3, in which a trench 1 with the intended trench depth $D_X$ is intended to be created. As specified in the example of FIG. 9, the database comprises in line #1 a data record comprising a sample property B1 and in line #2 a further data record comprising the sample property B1. FIG. 13 shows an exemplary illustration of a plurality of different regression curves, specifically the regression curve R1 of the data record from line #1, which comprises the sample property B1, and the regression curve R2 of the data record from line

2, which also comprises the sample property B1. The horizontal axis in FIG. 13 represents the implementation number for the ablation unit step, where a, b and c specify integers. The vertical axis in FIG. 13 represents the trench depth. The regression curves assign any desired trench depth an implementation number (and vice versa).

The regression curve R1 assigns the intended trench depth $D_X$ defined in step S403 a value X1, which is located between integers a and b and whose absolute value of the distance from the closest integer (in this case integer "a") is relatively large. Rounding the value X1 to the closest integer a may therefore lead to a relatively large deviation between the intended trench depth $D_X$ and an actual trench depth obtained by implementing the ablation unit step in accordance with the integer a.

The regression curve R2 assigns the intended trench depth $D_X$ defined in step S403 a value X2, which is located relatively close to integer b and whose absolute value of the distance from the closest integer (in this case integer "b") is relatively small. Rounding the value X2 to the closest integer b therefore leads to a relatively small deviation between the intended trench depth $D_X$ and an actual trench depth obtained by implementing the ablation unit step in accordance with the integer b.

According to the example, it is therefore advantageous in respect of the intended trench depth $D_X$ defined in step S403 to use the regression curve from the database which assigns the intended trench depth $D_X$ a value as close to an integer as possible, i.e. which satisfies a predetermined condition. This process is implemented in step S404.

Step S404 comprises: selecting one of the data records containing a first regression curve R, which assigns the intended trench depth $D_X$ a value satisfying a predetermined condition. By way of example, the predetermined condition is satisfied if an absolute value of a difference between the value and the integer closest to the value is less than a predetermined threshold value. Examples of the predetermined threshold value are 0.3 or 0.2 or 0.1.

Step S405, which follows step S404, comprises: obtaining a first particle beam system setting contained in the selected data record (selected in step S404).

Step S406, which follows step S404 or step S405, comprises: determining an implementation number X on the basis of the regression curve contained in the selected data record (selected in step S404) and the intended trench depth $D_X$.

Step S407, which is implemented after step S406 has been implemented, substantially corresponds to step S106, with reference being made to the description of the latter, and comprises: creating a trench 1 in the sample 3 by repeatedly implementing the ablation unit step with the first particle beam system setting (obtained in step S405) in accordance with the determined implementation number X (determined in step S406).

Combinations of Embodiments

The embodiments described herein can be combined with one another. For example, the fourth embodiment can be modified to the effect that the data records stored in the database are acquired by measurement on calibration samples as described in the first embodiment rather than assuming the data record as given.

What is claimed is:

1. A method of creating a trench with an intended trench depth in a sample by ablating material from the sample using a particle beam created by a particle beam system, the method comprising:
   defining a particle beam system setting which is a setting of the particle beam system used to implement an ablation unit step with the particle beam;
   using the defined particle beam system setting on a calibration sample to acquire calibration data records;
   determining a regression curve based on the acquired calibration data records, wherein the regression curve is defined based on a parameter that characterizes the ablation unit step;
   determining an implementation number based on the determined regression curve and the intended trench depth; and
   creating a trench in the sample by repeatedly implementing the ablation unit step with the defined particle beam system setting in accordance with the determined implementation number.

2. The method of claim 1, wherein acquiring the calibration data records using the defined particle beam system setting on the calibration sample comprises:
   arranging the calibration sample in a work region of the particle beam system onto which the particle beam is focused when ablating the sample; and
   repeating the following steps until a predetermined number of calibration data records is acquired:
   repeatedly implementing the ablation unit step with the defined particle beam system setting, whereby a trench in the calibration sample is created or deepened; and
   when a predetermined number of implementations of the ablation unit step has been reached, measuring a depth of the trench in the calibration sample and storing a calibration data record which comprises a current number of implementations of the ablation unit step and the measured current depth of the trench.

3. The method of claim 1, wherein determining the implementation number based on the determined regression curve and the intended trench depth comprises:
   determining a value which the regression curve associates with the intended trench depth; and
   rounding the determined value to a closest integer to determine the implementation number.

4. The method of claim 1, wherein creating a trench in the sample by repeatedly implementing the ablation unit step with the defined particle beam system setting in accordance with the determined implementation number comprises:
   arranging the sample in a work region of the particle beam system onto which the particle beam is focused when ablating the sample; and
   implementing the ablation unit step with the defined particle beam system setting until the determined implementation number of implementations of the ablation unit step is reached, whereby the trench in the sample is created or deepened.

5. The method of claim 1, wherein each individual implementation of the ablation unit step comprises:
   focusing the particle beam into a focal plane located in a work region of the particle beam system onto which the particle beam is focused when ablating the sample, wherein, upon the first focusing of the particle beam, the focal plane is set on a surface of the calibration sample to be ablated or on a surface of the sample to be ablated and wherein, upon subsequent focusing of the particle beam, the focal plane is offset by a constant preset focus displacement distance; and successively directing the particle beam at a multiplicity of different locations in the focal plane in accordance with the defined particle beam system setting.

6. The method of claim 1, wherein the particle beam system setting comprises at least one setting selected from the group consisting of:
- an intensity of the particle beam;
- a pulse length and a pulse repetition rate of pulses of the particle beam;
- a dwell time of the particle beam at each scanned location;
- a scanning path;
- a scanning speed; and
- a focus displacement distance.

7. The method of claim 1, wherein the regression curve specifies a relationship between a number of implementations of the ablation unit step and a trench depth.

8. The method of claim 7, wherein the relationship is expressed by:

$$d_n = \begin{cases} d_0 \left[1 + \left(\frac{D_{n-1} - F_n}{A}\right)^2\right]^{-1} & \text{for } \left[1 + \left(\frac{D_{n-1} - F_n}{A}\right)^2\right]^{-1} > G \\ 0 & \text{otherwise} \end{cases}$$

$$D_N = \sum_{n=1}^{N} d_n \text{ with } N \geq 1, D_0 = 0 \text{ and}$$

$$F_n = \begin{cases} F_0 \text{ for } n = 1 \\ (n-1) \cdot f_0 + F_0 \text{ for } n > 1 \end{cases}$$

wherein:
- N is a number of ablation unit steps;
- $D_N$ is an estimated trench depth after implementing N ablation unit steps;
- $d_o$ is an ablation depth of a single ablation unit step in the case of ideal focusing;
- $F_n$ is a position of the focus of the particle beam in a depth direction for an n-th implementation of the ablation unit step;
- $F_o$ is a deviation of the position of the focus of the particle beam in the depth direction from a surface to be ablated during the first implementation of the ablation unit step;
- $f_o$ is a focus displacement distance, by which the position of the focus of the particle beam is offset in the depth direction between successive ablation unit steps;
- A is a length of a portion of the particle beam in the depth direction, in which a local intensity of the particle beam exceeds an ablation threshold of the sample; and
- G is an ablation threshold, past which further implementations of the ablation unit step bring about no further ablation.

9. The method of claim 1, wherein the particle beam comprises a member selected from the group consisting of a light beam, a laser beam, a continuous laser beam, a pulsed laser beam, an electron beam, and an ion beam.

10. The method of claim 1, wherein acquiring the calibration data records using the defined particle beam system setting on the calibration sample comprises:
- arranging the calibration sample in a work region of the particle beam system onto which the particle beam is focused when ablating the sample; and
- repeating the following steps until a predetermined number of calibration data records is acquired:
  - repeatedly implementing the ablation unit step with the defined particle beam system setting, whereby a trench in the calibration sample is created or deepened; and
  - when a predetermined number of implementations of the ablation unit step has been reached, measuring a depth of the trench in the calibration sample and storing a calibration data record which comprises a current number of implementations of the ablation unit step and the measured current depth of the trench; and
- wherein determining the implementation number based on the determined regression curve and the intended trench depth comprises:
  - determining a value which the regression curve associates with the intended trench depth; and
  - rounding the determined value to a closest integer to determine the implementation number.

11. The method of claim 10, wherein creating a trench in the sample by repeatedly implementing the ablation unit step with the defined particle beam system setting in accordance with the determined implementation number comprises:
- arranging the sample in the work region; and
- implementing the ablation unit step with the defined particle beam system setting until the determined implementation number of implementations of the ablation unit step is reached, whereby the trench in the sample is created or deepened.

12. The method of claim 1, wherein acquiring the calibration data records using the defined particle beam system setting on the calibration sample comprises:
- arranging the calibration sample in a work region of the particle beam system onto which the particle beam is focused when ablating the sample; and
- repeating the following steps until a predetermined number of calibration data records is acquired:
  - repeatedly implementing the ablation unit step with the defined particle beam system setting, whereby a trench in the calibration sample is created or deepened; and
  - when a predetermined number of implementations of the ablation unit step has been reached, measuring a depth of the trench in the calibration sample and storing a calibration data record which comprises a current number of implementations of the ablation unit step and the measured current depth of the trench; and
- wherein creating a trench in the sample by repeatedly implementing the ablation unit step with the defined particle beam system setting in accordance with the determined implementation number comprises:
  - arranging the sample in the work region; and
  - implementing the ablation unit step with the defined particle beam system setting until the determined implementation number of implementations of the ablation unit step is reached, whereby the trench in the sample is created or deepened.

13. The method of claim 1, wherein acquiring the calibration data records using the defined particle beam system setting on the calibration sample comprises:
- arranging the calibration sample in a work region of the particle beam system onto which the particle beam is focused when ablating the sample; and
- repeating the following steps until a predetermined number of calibration data records is acquired:

repeatedly implementing the ablation unit step with the defined particle beam system setting, whereby a trench in the calibration sample is created or deepened; and when a predetermined number of implementations of the ablation unit step has been reached, measuring a depth of the trench in the calibration sample and storing a calibration data record which comprises a current number of implementations of the ablation unit step and the measured current depth of the trench; and wherein each individual implementation of the ablation unit step comprises:

focusing the particle beam into a focal plane located in a work region of the particle beam system onto which the particle beam is focused when ablating the sample, wherein, upon the first focusing of the particle beam, the focal plane is set on a surface of the calibration sample to be ablated or on a surface of the sample to be ablated and wherein, upon subsequent focusing of the particle beam, the focal plane is offset by a constant preset focus displacement distance; and successively directing the particle beam at a multiplicity of different locations in the focal plane in accordance with the defined particle beam system setting.

14. The method of claim 1, wherein acquiring the calibration data records using the defined particle beam system setting on the calibration sample comprises:

arranging the calibration sample in a work region of the particle beam system onto which the particle beam is focused when ablating the sample; and repeating the following steps until a predetermined number of calibration data records is acquired:

repeatedly implementing the ablation unit step with the defined particle beam system setting, whereby a trench in the calibration sample is created or deepened; and when a predetermined number of implementations of the ablation unit step has been reached, measuring a depth of the trench in the calibration sample and storing a calibration data record which comprises a current number of implementations of the ablation unit step and the measured current depth of the trench; and wherein the particle beam system setting comprises at least one setting selected from the group consisting of:
an intensity of the particle beam;
a pulse length and a pulse repetition rate of pulses of the particle beam;
a dwell time of the particle beam at each scanned location;
a scanning path;
a scanning speed; and
a focus displacement distance.

15. One or more machine-readable hardware storage devices comprising instructions that are executable by one or more processing devices to perform operations comprising the method of claim 1.

16. A system comprising:
one or more processing devices; and
one or more machine-readable hardware storage devices comprising instructions that are executable by the one or more processing devices to perform operations comprising the method of claim 1.

17. A method of creating a trench with an intended trench depth in a sample by ablating material from the sample using a particle beam created by a particle beam system and focused into a work region of the particle beam system, comprising:

providing a database comprising a plurality of data records, wherein each of the data records comprises a particle beam system setting, which is a setting of the particle beam system for implementing an ablation unit step with the particle beam, a sample property, which is a property of a calibration sample, and a regression curve, wherein the regression curve is defined on the basis of a that characterizes the ablation unit step;

selecting a first particle beam system setting and a first sample property, which are contained in one of the data records;

obtaining a first regression curve from the data record containing the first particle beam system setting and the first sample property;

determining an implementation number based on the first regression curve and the intended trench depth; and creating a trench in the sample by repeatedly implementing the ablation unit step with the first particle beam system setting in accordance with the determined implementation number.

18. A method of creating a trench with an intended trench depth in a sample by ablating material from the sample using a particle beam created by a particle beam system and focused into a work region of the particle beam system, the method comprising:

providing a database comprising a plurality of data records, wherein each of the data records comprises a particle beam system setting, which is a setting of the particle beam system for implementing an ablation unit step with the particle beam, a sample property, which is a property of a calibration sample, and a plurality of calibration data records, wherein each of the calibration data records comprises a predetermined implementation number for the ablation unit step and a depth of a trench created by implementing the ablation unit step in accordance with the predetermined implementation number;

selecting a first particle beam system setting and a first sample property, which are contained in one of the data records;

obtaining first calibration data records from the data record comprising the first particle beam system setting and the first sample property;

determining a regression curve based on the obtained first calibration data records, wherein the regression curve is defined on the basis of at least one parameter that characterizes the ablation unit step;

determining an implementation number based on the determined regression curve and the intended trench depth; and creating a trench in the sample by repeatedly implementing the ablation unit step with the first particle beam system setting in accordance with the determined implementation number.

19. A method of creating a trench with an intended trench depth in a sample by ablating material from the sample using a particle beam created by a particle beam system and focused into a work region of the particle beam system, comprising:

providing a database comprising a plurality of data records, wherein each of the data records comprises a particle beam system setting, which is a setting of the particle beam system for implementing an ablation unit step with the particle beam, a sample property, which is a property of a calibration sample, and a regression curve, wherein the regression curve is defined on the basis of at least one parameter that characterizes the ablation unit step;

selecting a first sample property from one of the data records;

selecting one of the data records comprising the selected first sample property and a first regression curve, which assigns the intended trench depth a value satisfying a predetermined condition;

obtaining a first particle beam system setting contained in the selected data record;

determining a first implementation number based on the regression curve contained in the selected data record and the intended trench depth; and creating a trench in the sample by repeatedly implementing the ablation unit step with the obtained first particle beam system setting in accordance with the determined first implementation number.

20. The method of claim 19, wherein the predetermined condition is satisfied when an absolute value of a difference between the value and the integer closest to the value is less than a predetermined threshold value.

* * * * *

UNITED STATES PATENT AND TRADEMARK OFFICE
CERTIFICATE OF CORRECTION

| | | |
|---|---|---|
| PATENT NO. | : 12,480,864 B2 | Page 1 of 1 |
| APPLICATION NO. | : 18/532516 | |
| DATED | : November 25, 2025 | |
| INVENTOR(S) | : Heiko Stegmann | |

It is certified that error appears in the above-identified patent and that said Letters Patent is hereby corrected as shown below:

In the Drawings

Sheet 9 of 12, Reference Numeral S306, in Figure 10, delete "implantation" and insert -- implementation --.

In the Specification

Column 10, Line 39, delete "$d_o$" and insert -- $d_n$ --.

Column 11, Line 8, delete "(n; D)" and insert -- (n; $D_n$) --.

In the Claims

Column 19, Line 38, in Claim 8, delete "$d_o$" and insert -- $d_0$ --.

Column 19, Line 43, in Claim 8, delete "$F_o$" and insert -- $F_0$ --.

Column 19, Line 47, in Claim 8, delete "$f_o$" and insert -- $f_0$ --.

Column 21, Line 56, in Claim 15, delete "One or more" and insert -- One or more non-transitory --.

Column 21, Line 62, in Claim 16, delete "one or more" and insert -- one or more non-transitory --.

Column 22, Line 11, in Claim 17, delete "of a that" and insert -- of a parameter that --.

Signed and Sealed this
Sixth Day of January, 2026

John A. Squires
*Director of the United States Patent and Trademark Office*